H. J. MERRENS.
Machinery for Manufacturing Hose
No. 202,451. Patented April 16, 1878.
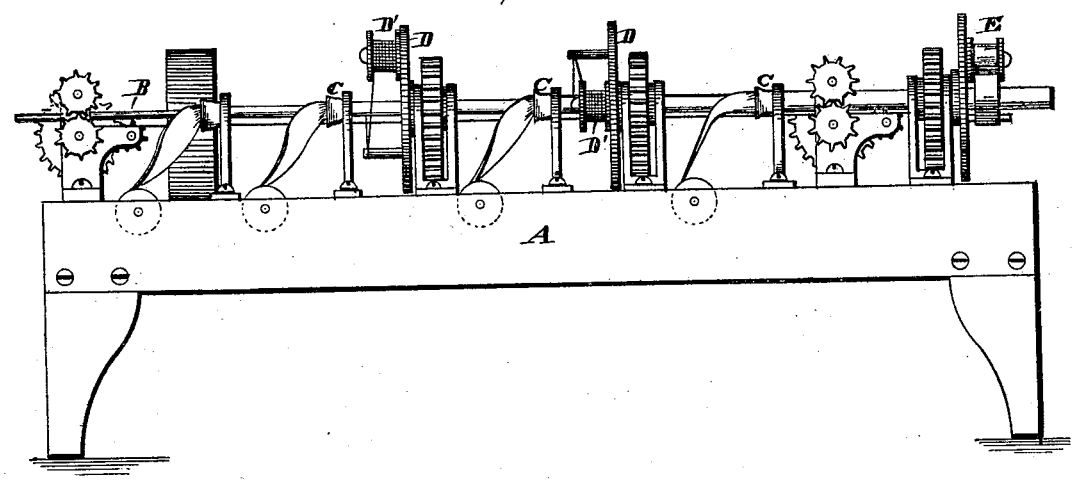
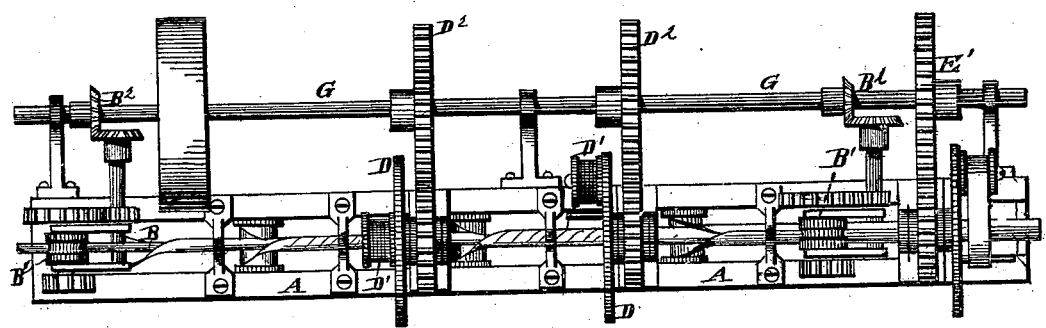
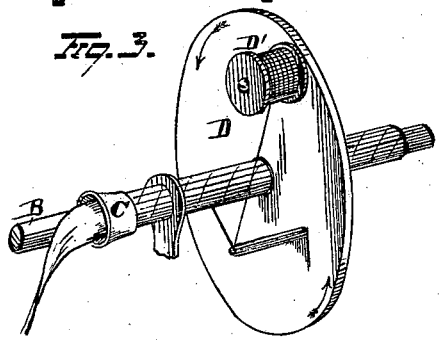
WITNESSES
Ed. T. Nottingham
A. W. Bright.
INVENTOR
H. J. Merrens.
By Leggett & Leggett,
ATTORNEYS

UNITED STATES PATENT OFFICE.

HENRY J. MERRENS, OF CLEVELAND, OHIO.

IMPROVEMENT IN MACHINERY FOR MANUFACTURING HOSE.

Specification forming part of Letters Patent No. 202,451, dated April 16, 1878; application filed February 14, 1878.

*To all whom it may concern:*

Be it known that I, HENRY J. MERRENS, of Cleveland, in the county of Cuyahoga and State of Ohio, have invented certain new and useful Improvements in Machinery for Making Hose; and I do hereby declare the following to be a full, clear, and exact description of the invention, such as will enable others skilled in the art to which it pertains to make and use it, reference being had to the accompanying drawings, which form part of this specification.

My invention relates to machinery for making hose of rubber, or of rubber combined with flexible material, or of flexible material only.

In the drawings, Figure 1 represents a side elevation of a device embodying my invention; Fig. 2, a plan view of the same; Fig. 3, a detached view of a single die and its surrounding parts, as in operation.

My invention consists in the following parts and combinations, as hereinafter specified and claimed, wherein A is a suitable frame for holding and accommodating the operative parts of the device, hereinafter to be specified. B is a core or mandrel, upon which the hose is formed, and it is driven forward through the machine (carrying the hose with it) by friction-wheels B', driven by suitable connection with the power operating the general machine.

The mandrel B is made in sections. Along the line on which the mandrel B lies are placed dies C C and cord-winders D D, said cord-winders being, like the friction-wheels B', driven by suitable connection with the power operating the general machine. Similar to and similarly placed as said cord-winders is the cover or envelope winder E. This is for applying the final wrapping or envelope in which the hose is vulcanized, and which is afterward removed. The number of dies C employed depends upon the character of hose desired to be produced, whether it be one, two, or more ply.

The characteristic features of my invention are the dies, to be hereinafter more fully described, and the placing of said dies and wrapping or cord-winding devices in a single machine along the line of the mandrel B, whereby each step of the process of making hose of any ply is taken and performed in its proper order and manner until, from the very first step to that point where the hose is ready for vulcanizing, the hose is finished by a single passage through the machine.

Fig. 3 of the drawings shows what I term a "die," constructed of metal or other suitable material, which receives the strip of rubber or fabric, as the case may be, and compels said rubber or fabric by passing through to assume a tubular or cylindrical shape, with its edges more or less overlapping.

Immediately following each stationary die C is a cord-wrapping device. I have here shown the ordinary construction of such a device, which is a disk or plate, D, caused to rotate around the mandrel B, carrying the spool D', upon which the cord or wire is wound, and which is paid out and wrapped upon the hose on the mandrel as it passes through the disk D.

As shown in the machine set forth in the drawings, the mandrel and its hose travel in the direction indicated by the arrow. The first die C receives a strip of rubber and forms it into a tube around the mandrel. The second die C receives a strip of fabric and disposes of it in a manner the same as the first die did the rubber strip. The mandrel is now clothed with one layer of rubber and one of fabric. Next follows a cord or wire wrapping device, which winds its contents snugly upon the covering of the mandrel. Next follows another die, which places a second ply of fabric, which is immediately wrapped with cord or wire by the following winder. Then follows a die which receives and places the final outside layer of rubber. This forms what is known as a "two-ply" hose; and it is manifest that it is only necessary to provide additional dies C to produce a hose of any desired number of plies.

It is not essential that the envelope-winder E should be made a part of my machine, although, for sake of convenience in the preparation of the hose for vulcanizing, I prefer to make it so. Its operation and construction are the same as one of the cord or wire winders, excepting that its spool is adapted to hold a broad band instead of a cord or wire.

I do not limit myself to any specific method of driving the mandrel B through the machine, I may either employ the means herein shown, or any other that may be advantageous. This mandrel may be solid or tubular, as it is or is not desired to heat it by steam or other agent.

G is a main shaft, to which the initial driving-power is applied. This shaft extends the length of the machine, and is journaled in the frame A. Upon this shaft is placed the gear or driving wheels $B^2$, for operating the friction-wheels driving the mandrel B; also the driving-wheels $D^2$, for operating the cord or wire winders; and also the driving-wheel E', for operating the envelope-winder E.

I am aware that heretofore a device has been employed to form a flanged hose, said device being substantially similar to the dies C, above described by me, with the exception that it is made longitudinally slotted, while my dies are each of continuous annular piece, and adapted to form a plane or unflanged hose.

What I claim is—

1. In a machine for making hose, one or more dies, C, each formed in a continuous annular piece, and adapted to receive a strip of material in a flat or opened condition, and to deliver it to the mandrel, substantially as shown.

2. The combination of the mandrel B and one or more dies, C, substantially as and for the purpose shown.

3. The combination of mandrel, dies, and cord or wire wrapper, substantially as and for the purpose shown.

4. The hose-making machine herein specified, consisting, essentially, of the mandrel B, the dies C, of sufficient number, and the cord or wire wrapping devices, all arranged to perform their functions in such order that a hose is finished to the stage of vulcanization, substantially as and for the purpose shown.

5. In combination with the mandrel B, dies C, and cord or wire wrappers D, the envelope-wrapper E, substantially as and for the purpose shown.

In testimony whereof I have signed my name to this specification in the presence of two subscribing witnesses.

HENRY J. MERRENS.

Witnesses:
F. TOUMEY,
W. E. DONNELLY.